D. J. MURNANE.
ANGLING MACHINE.
APPLICATION FILED MAY 12, 1916.

1,271,353.

Patented July 2, 1918.
3 SHEETS—SHEET 1.

Fig. 1.

Witnesses:

Inventor:
Daniel J. Murnane,

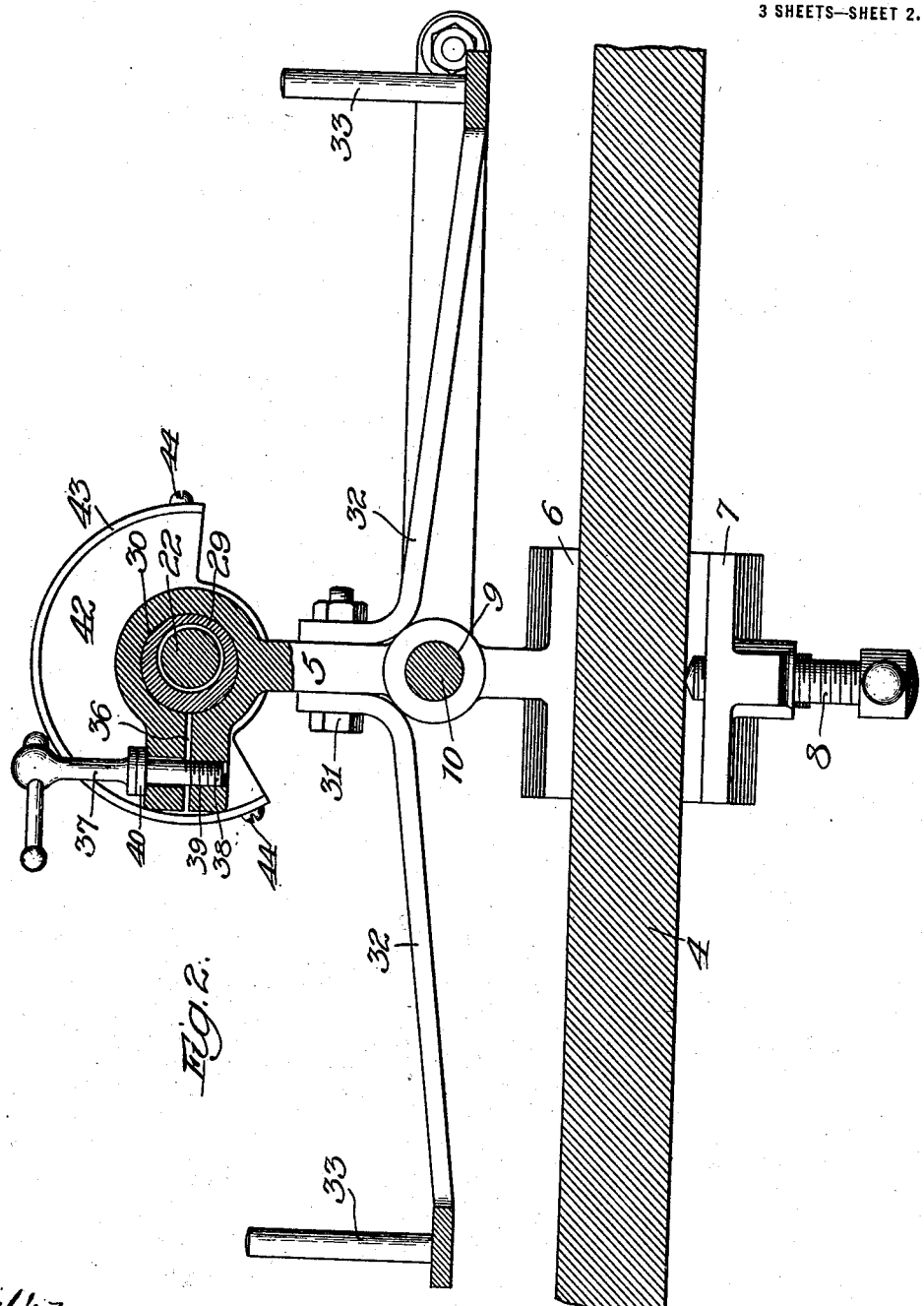

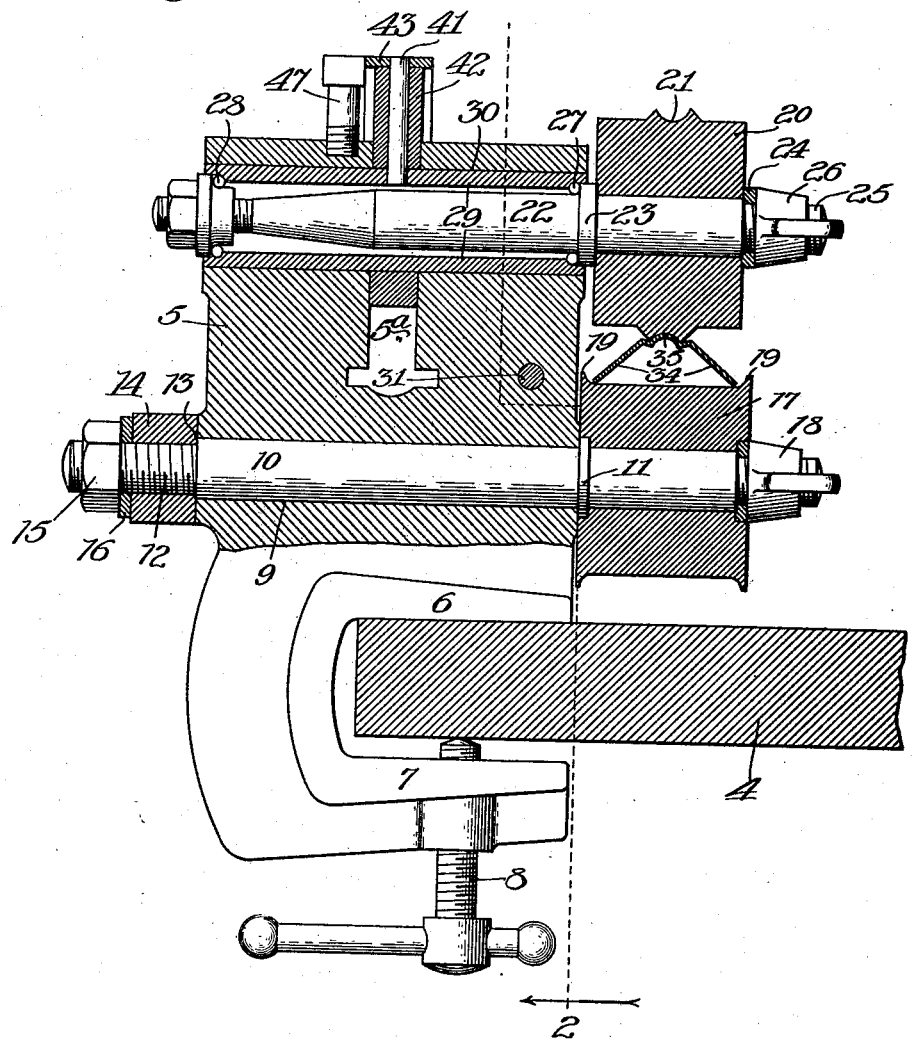

UNITED STATES PATENT OFFICE.

DANIEL J. MURNANE, OF CHICAGO HEIGHTS, ILLINOIS, ASSIGNOR TO ZOURI DRAWN METALS COMPANY, OF CHICAGO HEIGHTS, ILLINOIS, A CORPORATION OF ILLINOIS.

ANGLING-MACHINE.

1,271,353. Specification of Letters Patent. Patented July 2, 1918.

Application filed May 12, 1916. Serial No. 97,044.

*To all whom it may concern:*

Be it known that I, DANIEL J. MURNANE, a citizen of the United States, residing at Chicago Heights, in the county of Cook and State of Illinois, have invented a new and useful Improvement in Angling-Machines, of which the following is a specification.

My invention relates more particularly to apparatus of the general character above stated, for spreading the sides of metal molding to cause them to assume the desired angular relation to each other, for effecting the desired fit of the molding to the parts with which it is assembled, as, for example, in store front constructions, where, under varying conditions, the angle presented by the sides of the molding varies from approximately ninety degrees to one hundred and forty degrees. It may be further stated that in practice it is not commercially feasible, in the initial production of the molding, to provide the molding of the various angles necessary to meet all conditions in practice, but to provide the molding of a certain few angles and thereafter spread the sides thereof into the position, the particular condition at hand, requires.

Furthermore, in order that the molding be properly interfitted with the other parts of the structure, the sides of the molding should extend at a predetermined angle, depending upon the particular condition presented, as distinguished from a condition wherein the sides of the molding may extend relative to each other approximately at a certain angle and a margin of a number of degrees is allowable, this condition rendering highly desirable the provision of means whereby a molding may be spread with accuracy to the desired angle.

My object generally stated is to provide a novel, simple and economical device, for the purpose above stated, which may be adjusted quickly and accurately to effect the spreading of the molding to the desired angle, whereby the operator upon setting the machine to produce the spreading of the molding, insures the spreading of the molding to the desired angle, this feature of the machine permitting unskilled workmen to readily spread the molding to the desired angle and without danger of waste of the material.

Referring to the accompanying drawings,—Figure 1 is a plan view of my improved device showing it applied to operative position on a bench. Fig. 2 is a section taken at the irregular lines 2 on Figs. 1 and 3 and viewed in the direction of the arrow; and Fig. 3, a section taken at the line 3 on Fig. 1 and viewed in the direction of the arrow.

In accordance with the preferred embodiment of my invention, the device is adapted, in view of the conditions under which it would be commonly used, to be clamped to a bench or table, the top of which is represented at 4. To this end the body portion 5 of the device, which may be a casting, is provided at its lower end with a pair of jaws 6 and 7, the jaw 7 containing a threaded-opening in which screws a set-screw 8, adapted to engage the underside of the table 4 and clamp the latter between the set-screw 8 and the jaw 6. Journaled in an opening 9 in the body 5 of the device, to extend above the table-top 4, is a shaft 10, which is provided near one end with a collar 11 opposing one end of the member 5, and with a reduced threaded-portion 12, affording a shoulder 13 adjacent the opposite end of the member 5. The shaft 10, in the construction illustrated, is adapted to be rotated by means of a crank-handle 14 which screws upon the threaded-end 12 of the shaft 10 and against the shoulder 13, a nut 15 screwing upon this end of the shaft 10 and against a washer 16 interposed between the handle 14 and the nut. The end of the shaft 10 opposite to that equipped with the handle 14 has rigidly secured thereto a roll 17, this roll being releasably held to the shaft 10 by the wing-nut 18, the periphery of the roll 17, by preference, having the annular flanges 19 at its opposite edges as represented.

Coöperating with the roll 17, in a manner hereinafter described, is a roll 20, having its periphery shaped to conform to the outer side of the molding, for example, as shown at 21. The roll 20 is rigidly secured on an end of a shaft 22 extending parallel with, and above, the shaft 10, as by clamping this roll between a collar 23 on the shaft and a washer 24 surrounding the threaded-end 25 of the shaft and backed by a wing-nut 26 screwing upon the threaded portion 25 of the shaft.

The end of the shaft 22 opposite the end which carries the roll 20 is journaled at ball-bearings 27 and 28 in a sleeve 29 which extends through and is rotatably adjustable in a bore 30 provided in the upper end of the member 5, the shaft 22 being eccentrically disposed relative to the sleeve 29, as clearly represented in Fig. 2, it being readily understood from the foregoing that by rotatably adjusting the sleeve 29 in its bearing, the roll 20 will be adjusted toward, or away from, the roll 17, as the case may be.

For convenience of operation, the member 5 has secured thereto, as by the bolt 31, oppositely-extending arms 32 which project from the member 5 at angles to the axes of the shafts 10 and 22 and are provided at their extremities with upwardly-extending pins 33, spaced apart, as represented in Fig. 1.

In the use of the device the molding to be spread, as, for example, the molding represented at 34, is introduced at one end into the space between the rolls 17 and 20, to engage, at its upper central surface 35, with the portion 21 of the roll 20, and at its marginal edges with the periphery of the roll 17, the pins 33 serving as guides for the strip. Upon rotating the shaft 10, through the medium of the handle 14, the molding 34, by reason of the frictional engagement of the rolls 17 and 20 therewith, is advanced through the space between these rolls, and in this operation its side members are spread to the desired angular position.

In the particular construction illustrated the portion of the member 5 which contains the front portion of the bore 30 is split, as represented at 36, and coöperating with these split portions is a clamping device, represented at 37. The clamp, which is in the form of a stem, is provided at its lower end with a threaded-section 38, adapted to engage internal screw-threads 39 in the lower section of the split portions 36, this clamp being provided intermediate its ends with a shoulder 40 between which and the threads 38 the stem loosely passes through an opening in the upper portion of the split portions 36, whereby, upon rotating the stem 37 in one direction, the split portions 36 will be drawn together for tightly gripping the sleeve 29, to hold it in adjusted position, and when rotated in the opposite direction will permit the split portions to spread, to release the grip on the sleeve 29.

In order to permit the operator to readily adjust the eccentric sleeve 29 to a position for spreading the sides of the molding to the desired angle, I provide the mechanism which is in the nature of a protractor, of which the following is a description.

Surrounding the sleeve 29 and rigidly secured thereto, as by a pin 41, is a plate 42 in the form of a segment of a circle, this plate extending into a slot 5ª in the member 5. The periphery of the plate 42 is, in the construction illustrated, formed of a separate member 43 which describes an arc of a circle and is secured in place, as by screws 44. The upper surface of the member 43 is provided with graded markings 45 which are so arranged, relative to the proportions and positions of the parts of the device, that when these markings are brought into registration with a marking 46, shown as provided on the upper surface of a screw 47, secured in the member 5 adjacent the plate 42, the roll 20, by reason of the adjustment of the eccentric sleeve 29, with the plate 42, will extend at the proper distance above the roll 17 for spreading the sides of the molding 34 to a position wherein they will extend, relative to each other, at the angle indicated by the marking opposite the particular marking 45, opposing the marking 46. Thus, for example, assuming that the molding 34, the sides of which would be preliminarily and initially formed to extend at ninety degrees to each other, is to be spread to cause its sides to extend at an angle of one hundred degrees to each other, the operator, upon unloosening the clamp 37 to permit the sleeve 29 to be rotated, would rotate the plate 42 and with it the sleeve 29, to a position wherein the marking 45 opposite the numeral 100 on the plate 43, would be in line with the marking 46, and upon inserting the molding into place between the rolls 17 and 20 and operating the shaft 10, as hereinbefore described, the molding would be spread to the desired angle of one hundred degrees.

What I claim as new and desire to secure by Letters Patent is:—

1. In a machine for the purpose of changing the angle of molding, the combination of a body-member containing a bore and slotted to provide a split bearing, a shaft on said member, a roll on said shaft, a rotatably supported member in said bearing provided with end journals, a roll journaled in said last-named member on an axis eccentric of the axis of the latter and opposing said first-named roll, the axis about which said last-named roll rotates extending substantially parallel with said rolls, said rolls being adapted to receive between them the molding to be operated on, means engaging the split portions of said body-member for releasably holding said rotatably supported member in adjusted position, and means on said last-named member coöperating with the stationary part of the machine for indicating the position of the rotatably supported roll, with reference to the other roll of the pair.

2. In a machine for the purpose of changing the angle of molding, the combination of a body-member provided with an opening adjacent its lower end, a shaft extending through said opening, a roll on said shaft, a bore in said body-member adjacent its upper end, a slot in said body-member to provide a split bearing, a rotatably-supported member in said bearing and containing an eccentrically-disposed opening, a shaft journaled in said opening and supporting a second roll, the axis of said last-named shaft extending substantially parallel with the axes of said rolls whereby upon rotatably adjusting said last-named member said last-named roll is adjusted relative to its companion roll to vary the space between said rolls, said rolls being adapted to receive between them the molding to be operated on, means engaging the split portions of said body-member for releasably holding said rotatably-supported member in adjusted position, and a plate carried by said last-named member and provided with markings coöperating with a relatively stationary part of the machine for indicating the position of the adjustably-supported roll with reference to the other roll of the pair.

DANIEL J. MURNANE.

Copies of this patent may be obtained for five cents each, by addressing the "Commissioner of Patents, Washington, D. C."